UNITED STATES PATENT OFFICE.

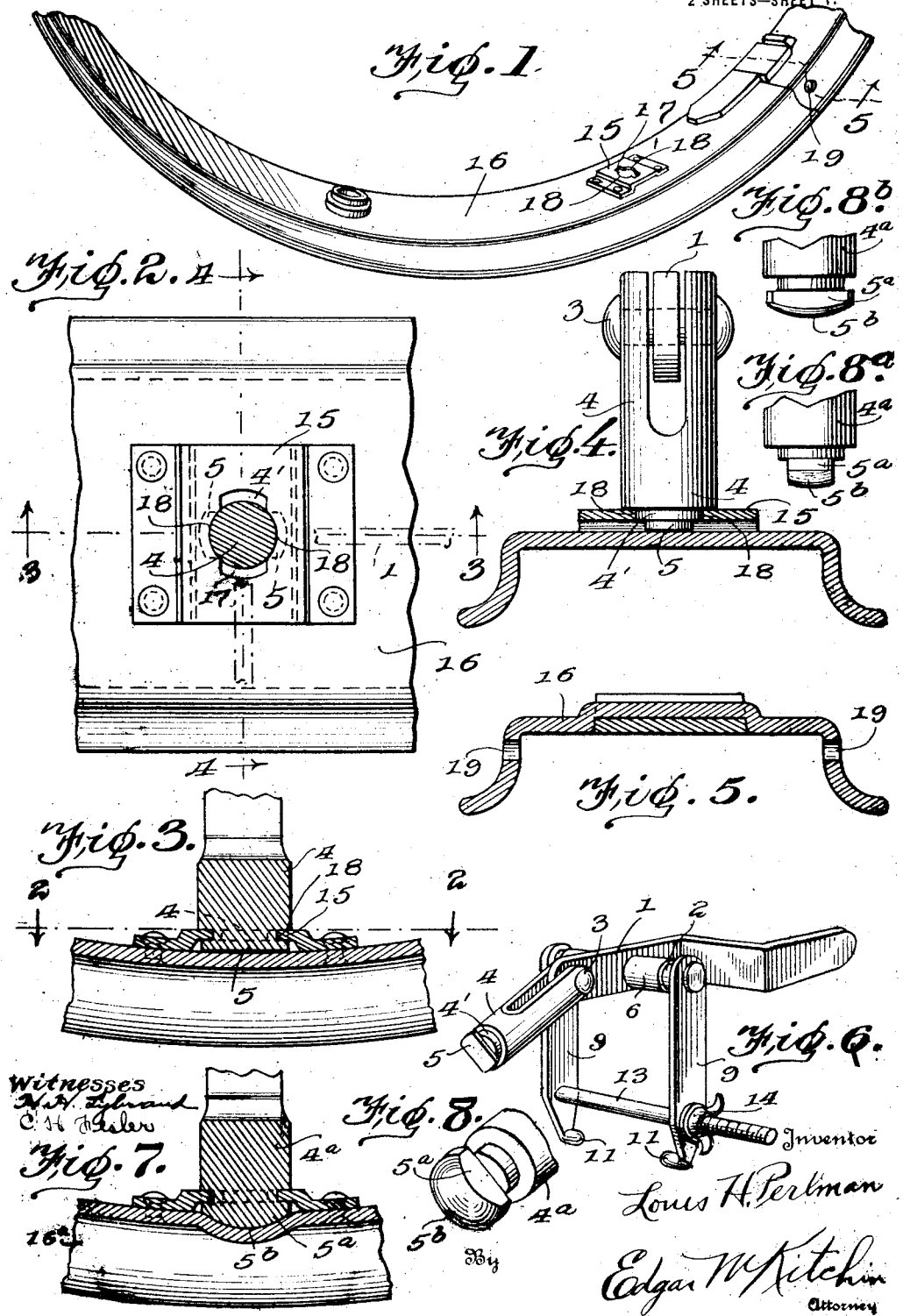

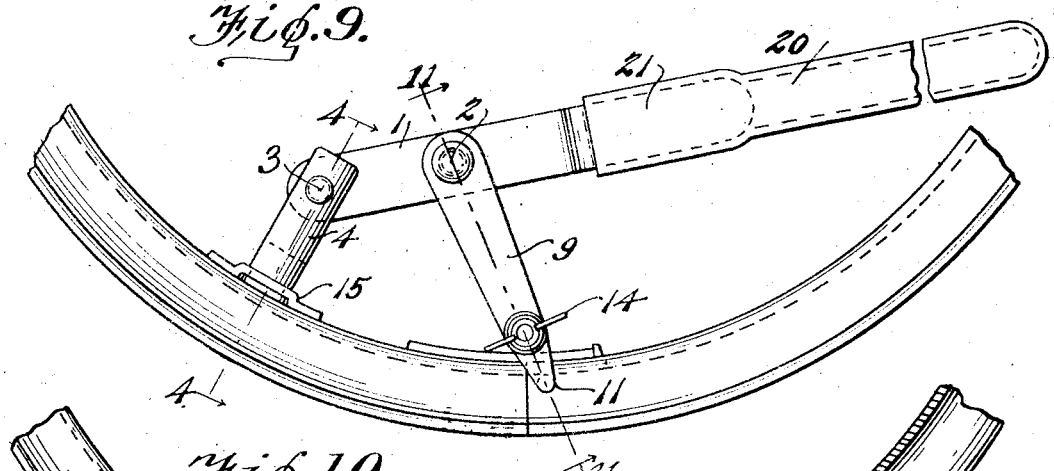
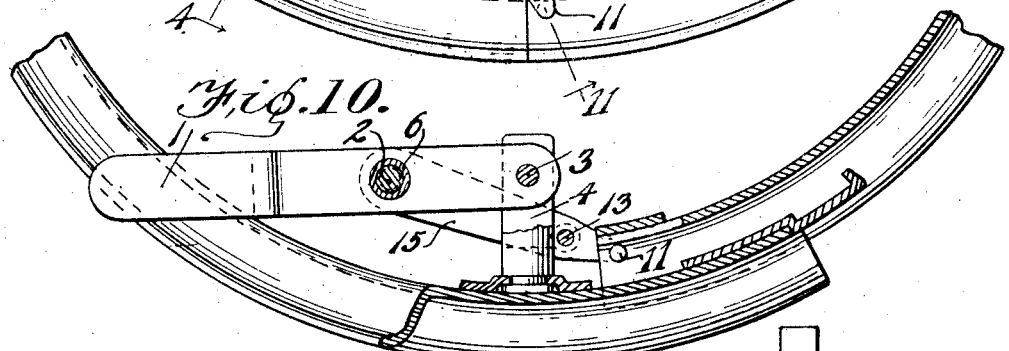
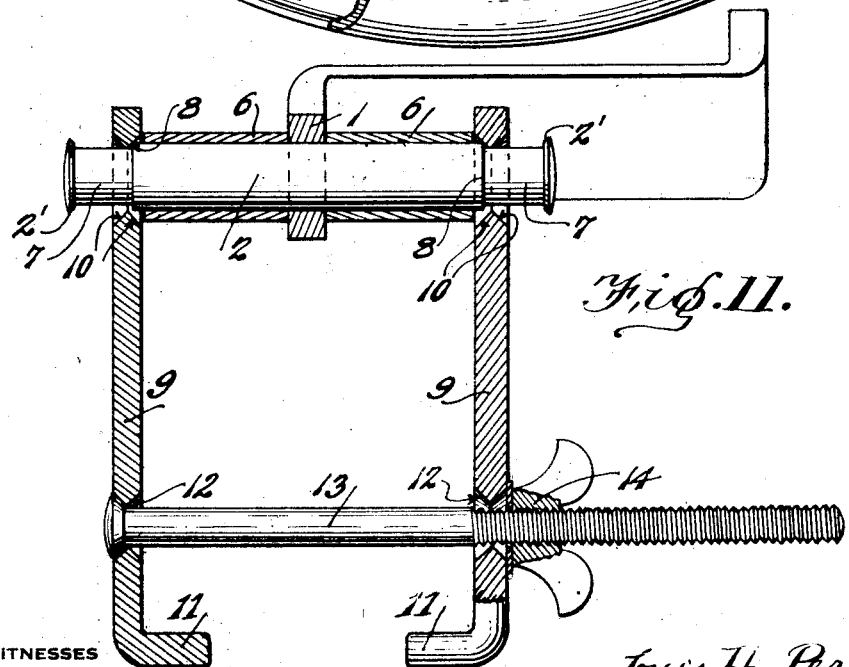

LOUIS H. PERLMAN, OF NEW YORK, N. Y., ASSIGNOR TO GENERAL MOTORS CORPORATION, A CORPORATION OF DELAWARE.

DEMOUNTABLE-RIM-OPERATING TOOL.

1,388,195.   Specification of Letters Patent.   Patented Aug. 23, 1921.

Application filed August 16, 1917. Serial No. 186,524.

*To all whom it may concern:*

Be it known that I, LOUIS H. PERLMAN, a citizen of the United States, residing at New York, in the county of New York and State of New York, have invented certain new and useful Improvements in Demountable-Rim-Operating Tools; and I do hereby declare the following to be a full, clear, and exact description of the invention, such as will enable others skilled in the art to which it appertain to make and use the same.

This invention relates to improvements in tools for operating demountable rims of automobile wheels, and more particularly to such tools as are adapted for manipulating a cross-cut demountable rim during the operation of removing and replacing a tire on such a rim.

The object in view is the provision of means for facilitating manual manipulation of a rim for expediting and reducing the labor of mounting a tire on a cross-cut demountable rim and removing a tire therefrom.

With this and further objects in view as will in part hereinafter become apparent and in part be stated, the invention comprises certain novel constructions, combinations and arrangements of parts as subsequently specified and claimed.

In the acompanying drawings,—

Figure 1 is a perspective view of a fragment of a rim constructed to receive the present improved operating tool.

Fig. 2 is an enlarged detail, fragmentary plan view of that portion of the rim provided with the fulcrum post receiving plate.

Fig. 3 is a vertical section therethrough taken on the plane indicated by line 3—3 of Fig. 2.

Fig. 4 is a cross section taken on the plane indicated by line 4—4 of Fig. 2 and also of Fig. 9.

Fig. 5 is a cross section taken on the plane indicated by line 5—5 of Fig. 1.

Fig. 6 is a perspective view of the tool detached.

Fig. 7 is a view similar to Fig. 3 of a slightly modified embodiment.

Fig. 8 is an enlarged, detail, fragmentary perspective view of the end portion of the embodiment of fulcrum post as seen in Fig. 7.

Figs. 8ª and 8ᵇ are detail views of the lower end portion of the fulcrum post embodying the modification of Fig. 7.

Fig. 9 is a view in elevation of a fragment of the rim with the tool applied.

Fig. 10 is a similar view of the same parts with the tool and rim shown in position with the rim collapsed, parts being broken away for clearness of disclosure.

Fig. 11 is a vertical cross section taken on the plane indicated by line 11—11 of Fig. 9, the rim being omitted and the parts being shown on an enlarged scale.

Referring to the drawing by numerals, 1 indicates an operating lever which is pivoted on a shaft 2 and has one of its ends fulcrumed on pivot 3 carried by a bifurcated fulcrum post 4. The free end of the post 4 is formed with a preferably integral button 5 which extends beyond the sides of the post so as to form oppositely-extending outstanding projections. As a matter of facility of construction, the post 4 may be annularly grooved or cut away just above the button 5 so as to leave the projecting ends of the button outstanding relative to the reduced portion, as indicated at 4', without having the ends of the button actually outstand beyond the surface of the major portion of the post. The shaft 2 is surrounded by sleeves 6, 6, arranged at opposite sides of the lever 1 and serving as spacers therefor. The shaft 2 is provided with heads 2' at its ends and just inside of each head 2' the shaft is preferably reduced to form a cylindrical bearing 7 terminating in a shoulder 8. Each bearing 7 extends through an eye in a link 9, the eyes of the links 9 being sufficiently larger than the bearing 7 to allow the links to have full play thereon. In the course of the application of the tool, it is desirable that the links 9 shall not only be free to shift laterally, but to also swing laterally so as to assume angular variations with respect to each other, and to this end the eye of each of the links is formed with a double bevel 10 so as to present only an edge to the bearing 7 and allow the link to play in all directions. The opposite ends of the links from those provided with the said eyes terminate in hooks 11 and adjacent said hooks the links are formed with similarly formed eyes 12, 12, through which extends a connecting bolt 13 having an operating nut 14 preferably of the winged type.

The button 5 is made narrower in one of its dimensions than the other so that it is substantially oblong, and a plate 15 is fixed to the demountable rim 16 having a substantially oblong opening 17 corresponding to the contour of the button 5. The plate 15 is fixed to the inner face of the demountable rim and although the rim structure itself is no part of the present invention those features thereof which coöperate with the tool will be described for facility of disclosure of the utility of the tool. The plate 15, as clearly seen in Figs. 3 and 4, is formed with an intermediate offset portion which is spaced from the inner surface of the rim 16 while the plate is riveted or otherwise fixed thereto, and it is in this particular offset portion that the aperture 17 is formed. The aperture 17 in addition to being substantially oblong is formed intermediate its ends with arcuate enlargements 18, 18, corresponding in proportions to the proportions of the neck or reduced portion 4' of post 4, so that the said neck may revolve freely within the aperture 17 when in register with said enlargements 18. Thus, in operation, the button 5 may be readily introduced through the aperture 17 until the neck 4' occupies the space formed by the aperture 17 and enlargements 18, and then the post is revolved through ninety degrees so as to bring the projecting ends of the button 5 into the position underhanging the offset portion of plate 15. At the same time the annular shoulder of post 4 above the neck or reduced portion 4' overhangs the said plate, as clearly indicated in Fig. 3, and the post is thus effectively anchored to the rim in a manner capable of easy detachment and ready application. As seen in Fig. 2, the lever 1 will be in the position indicated in dotted lines across the rim when the tool is being applied and will be in the position indicated in dotted lines parallel to the rim when the tool is anchored and ready for use. The removal of the post 4 requires merely that the lever shall be swung from the latter to the former position and the post lifted out of its engaging socket formed by plate 15.

The rim 16 is cross-cut near the plate 15 and provided with an appropriate latch for connecting the cut ends. That end of the rim which is not provided with the plate 15 is formed with eyes 19, 19, in its flanges adapted to receive the hooks 11 and when it is desired to apply the tool to the rim the fulcrum post is applied in the manner above stated, and then the links 9 are positioned with the hooks 11 in the apertures 19. This is accomplished by threading back the nut 14 along the bolt 13 until the hooks may be separated sufficiently to enter the apertures 19 and thereupon the nut 14 is threaded back for drawing the links 9 toward each other sufficiently for causing them to clasp the interposed rim. The parts are then ready for application and the lever 1 is swung from the position indicated in Fig. 9 to the position indicated in Fig. 10. This movement lifts the end of the rim having the eyes 19 out of engagement with the latch and springs it over the latch carrying end to the collapsed position which results in the effective contracting of the diameter of the rim. This conditions the rim either to receive or permit the removal of a tire having a non-extensible bead.

As a matter of facility, in operation, the lever 1 is preferably offset, as clearly seen in Figs. 6 and 11, so as to bring the handle part of the lever approximately in the plane of the edge of the rim. To increase the leverage and proportionally increase the ease of manipulation, this handle part is preferably elongated, but to prevent the provision of a tool of too great length a detachable handle section 20 is preferably provided having a socket 21 designed to detachably engage the free end of the lever 1. After the rim has been brought to the position indicated in Fig. 10 and the desired manipulations of the tire have been carried out, the rim may be restored to its former condition by swinging the lever 1 back to the position indicated in Fig. 9, and I find that in practice the tool constructed as described is very effective in forcing the end of the rim having the eyes 19 back into its latch-engaging position.

A very similar operating tool to that above described is set forth and claimed in my co-pending application Serial No. 135,071, filed December 4, 1916, but I find that the play allowed the links in the structure shown in that application is not sufficient for enabling the tool to be applicable to a very large range of sizes of rims. In other words, the tool as set forth and claimed in the said application is effective for a definite size of rim or perhaps for some variations in sizes, but is not well adapted for all sizes as is the tool herein set forth. This is due to the fact largely that the links 9 as disclosed herein are allowed the widest possible range of adjustment in every direction relative to their engaging and restraining devices.

In Figs. 7, 8, 8ª and 8ᵇ, I have shown a slightly modified embodiment wherein the fulcrum post 4ª is provided with a button 5ª and other parts corresponding with the post 4 with the exception that the button 5ª is parti-globular on its under face as indicated at 5ᵇ. The rim 16ª is correspondingly depressed to form a parti-spherical recess for the reception of the under face of the button 5ª. The other parts in this modified showing are identical with those above described, and, therefore, require no further detail description. It is obvious that the parti-globular form of the face 5ᵇ of button 5 greatly increases the strength of the button over the form seen in Fig. 3, and adapts the fulcrum post for use with the heavier types of rims.

What is claimed is:—

1. An operating tool for manipulating a cross-cut demountable rim comprising a fulcrum post adapted to be rigidly and detachably connected to the rim, a lever pivoted to said post, a shaft pivotally engaged by the lever and having elongated reduced bearings, a link pivotally engaging each bearing and having an eye surrounding the bearing, the eye being formed with a double bevel for receiving the link free to rock on the bearing and to have free play thereon in all directions, and means of engagement on the links adapted to engage the opposite end portion of the rim from that engaged by the post.

2. An operating tool for manipulating a cross-cut demountable rim comprising a fulcrum post having a button at one end of greater length than width and having a shouldered portion spaced from the button for enabling the button to be inserted in a slot through a portion of the rim and to be rotated beneath the material of the slot so that the terminals of the button will underhang such material while the shoulder overhangs the material, and means engaging the fulcrum post for shifting one end of the rim relative to the other.

3. An operating tool for manipulating a cross-cut demountable rim comprising a fulcrum post having a button at one end of greater length than width and having a shouldered portion spaced from the button for enabling the button to be inserted in a slot through a portion of the rim and to be rotated beneath the material of the slot so that the terminals of the button will underhang such material while the shoulder overhangs the material, and means engaging the fulcrum post for shifting one end of the rim relative to the other, the said button being formed with a parti-globular face.

In testimony whereof I affix my signature in presence of two witnesses.

LOUIS H. PERLMAN.

Witnesses:
I. B. LEIBSON,
E. M. FRÜHLING.